(12) United States Patent
Goto

(10) Patent No.: US 7,701,531 B2
(45) Date of Patent: Apr. 20, 2010

(54) COLD-CATHODE FLUORESCENT LAMP FOR LCD HAVING CUP-SHAPED ELECTRODES INSIDE MANTLE TUBE WITH A NON-SPUTTERED TRANSPARENT CONDUCTIVE FILM OF A PREDETERMINED THICKNESS FORMED ON INSIDE SURFACE OF MANTLE TUBE NEAR EACH OPEN END OF THE CUP-SHAPED ELECTRODES

(75) Inventor: Tokunori Goto, Mobara (JP)

(73) Assignees: Hitachi Displays, Ltd., Chiba-ken (JP); Hitachi Display Devices, Ltd., Chiba-ken (JP)

( * ) Notice: Subject to any disclaimer, the term of this patent is extended or adjusted under 35 U.S.C. 154(b) by 585 days.

(21) Appl. No.: 11/636,461

(22) Filed: Dec. 11, 2006

(65) Prior Publication Data

US 2007/0138934 A1 Jun. 21, 2007

(30) Foreign Application Priority Data

Dec. 14, 2005 (JP) ............................. 2005-360616

(51) Int. Cl.
*G02F 1/1335* (2006.01)
(52) U.S. Cl. .................... 349/70; 349/71; 313/491
(58) Field of Classification Search .................. 349/70, 349/71; 313/491
See application file for complete search history.

(56) References Cited

U.S. PATENT DOCUMENTS

2004/0253427 A1* 12/2004 Yokogawa et al. .......... 428/212
2005/0017627 A1* 1/2005 Asai et al. .................. 313/491

FOREIGN PATENT DOCUMENTS

JP 2001-076617 8/1999
JP 2002-231133 1/2001

\* cited by examiner

*Primary Examiner*—John Heyman
(74) *Attorney, Agent, or Firm*—Stites & Harbison PLLC; Juan Carlos A. Marquez, Esq.

(57) ABSTRACT

A liquid crystal display is provided with a cold-cathode fluorescent lamp including a glass mantle tube having an inside surface coated with a fluorescent film, cup-shaped electrodes disposed in opposite end parts of the mantle tube with their open ends opening into a discharge region in the mantle tube. A discharge inducing ITO film is formed in a part near each of the cup-shaped electrodes of the inside surface of the mantle tube. Cosmic rays from space penetrated the transparent glass tube and the fluorescent film and received by the discharge inducing ITO films activate free electrons moving in the glass tube and, at the same time, electrons emitted by the cup-shaped electrodes when a voltage is applied across the cup-shaped electrodes induces an electric discharge to make the cold-cathode fluorescent lamp light instantly.

5 Claims, 4 Drawing Sheets

COLD-CATHODE FLUORESCENT LAMP FOR LCD HAVING CUP-SHAPED ELECTRODES INSIDE MANTLE TUBE WITH A NON-SPUTTERED TRANSPARENT CONDUCTIVE FILM OF A PREDETERMINED THICKNESS FORMED ON INSIDE SURFACE OF MANTLE TUBE NEAR EACH OPEN END OF THE CUP-SHAPED ELECTRODES

CLAIM OF PRIORITY

The present application claims priority from Japanese Application JP2005-360616 filed on Dec. 14, 2005, the content of which is hereby incorporated by reference into this application.

BACKGROUND OF THE INVENTION

1. Field of the Invention

The present invention relates to a cold-cathode fluorescent lamp for illuminating a liquid crystal display panel with illuminating light and a liquid crystal display provided with a backlight unit including the cold-cathode fluorescent lamp. More particularly, the present invention relates to the construction of a cold-cathode fluorescent lamp.

2. Description of the Related Art

Discharge tubes are used widely as low-power consumption light sources, high-luminance light sources, long-life light sources or small light sources in various illuminating devices. A low-pressure discharge tube formed by coating the inside surface of a mantle tube made of a transparent, insulating material, such as glass, with a fluorescent material, and sealing an inert gas and mercury in the mantle tube is known as a fluorescent lamp. Low-pressure discharge tubes of this kind are classified into those of a hot cathode type using electrons emitted by a hot cathode and those of a cold-cathode type using electrons emitted by a cold cathode.

An image display provided with a nonluminescent liquid crystal display panel visualizes electronic latent images formed on the liquid crystal display panel by an external illuminating system. The external illuminating system, excluding those using natural light, includes an illuminating device disposed opposite to the front or the back surface of the liquid crystal display panel. Most display devices required to have high luminance, in particular, are provided with an illuminating device disposed opposite to the back surface of the liquid crystal display panel. This illuminating device is called a backlight unit.

Backlight units are classified roughly into those of a direct type and those of a side-edge type. The side-edge type backlight unit has a linear light source, typically, a cold-cathode fluorescent lamp, extended along a side edge of a transparent light guide plate. The side-edge type backlight unit is used prevalently in thin display devices for personal computers and the like. Most large liquid crystal displays to be used as displays for display monitors and television receivers employ the direct backlight unit. The direct backlight unit includes an illuminating device disposed directly below the back surface of a liquid crystal display.

For example, a cold-cathode fluorescent lamp (CCFL) that energizes a fluorescent coating with electrons emitted by a cold cathode is used as a light source for the illuminating device of a liquid crystal display. In general, a cold electrode for emitting electrons is made of a metal, such as nickel. Such a cold electrode has a spurring property and hence the cold electrode wears out. Therefore, the electrode of the cold-cathode fluorescent lamp needs to be formed in a large size provided that the electrode can be received in a selected mantle tube. The large electrode has a large surface area. Consequently, current density per unit area decreases and the decreased current density reduces the amount of the material of the electrode deposited by sputtering on the inside surface of the mantle tube during an aging discharge process to which the cold-cathode fluorescent lamp is subjected prior to shipping.

The cold-cathode fluorescent lamp of this kind is required to shorten a discharge start time, i.e., a time needed to make the cold-cathode fluorescent lamp start an electric discharge. Particularly, it has been a problem that the discharge start time increases in darkness. It is known that, when part of the electrode made of nickel is deposited in a sputtered film on the inside surface of the mantle tube by sputtering, usually the discharge start time is shortened by electrons induced from the sputtered film. If a cup-shaped electrode having an open end having a small outside diameter as compared with the inside diameter of the mantle tube, deposition of the material of the cup-shaped electrode by sputtering on the inside surface of the mantle tube is promoted. However, the sputtering causes the electrode to wear out and shortens the life of the electrode. Moreover, the effect of the sputtered film formed by the aging process on shortening the discharge start time is not satisfactory.

Placing a discharge inducing substance in the mantle tube, in particular, in a part of the inside surface of the mantle tube near the electrode is effective to shorten the discharge start time. A known first discharge time shortening method deposits a metal compound film of a highly electron emissive metal compound on a surface of an electrode. For example, the highly electron emissive metal compound is a cesium compound, such as cesium chromate. A known second discharge time shortening method uses a mixture of a highly electron emissive metal compound, such as a cesium compound, and a mercury emissive substance and diffuses the highly electron emissive metal compound, such as the cesium compound, in a tube during mercury emission heating in a manufacturing process. A known third discharge time shortening method supplies a high current between about 8 and about 15 mA to an electrode having an outside diameter of 1.7 mm to deposit a sputtered film of the material of the electrode on a part near each of the electrodes of the inside surface of a mantle tube by heating the electrode. A known fourth discharge time shortening method uses a fluorescent film containing alumina.

More concretely, a discharge time shortening method disclosed in Japanese Patent Laid-Open No. 2001-76617 deposits a sputtered film containing, as a principal component, a metal or a metal compound on a part near a cup-shaped electrode of the inside surface of a mantle tube by sputtering, and induces an electric discharge by electrons emitted by the cup-shaped electrode when a voltage is applied to the cup-shaped electrode to start an electric discharge in a short time. A discharge time shortening method disclosed in Japanese Patent Laid-Open No. 2002-231133 uses a cup-shaped electrode having a large surface area, deposits a thin film containing a metallic material on the inside surface of the cup-shaped electrode, and forms a film of the metallic material on a part near each of the cup-shaped electrodes of the inside surface of a mantle tube by hot vaporization in an aging process.

SUMMARY OF THE INVENTION

In general, a welding process for connecting the cup-shaped electrode and a power supply line uses a resistance welding method or laser welding method. A considerable amount of an oxide of the material of the cup-shaped electrode deposits on the inside surface of the cup-shaped electrode during the welding process. When the cold-cathode fluorescent lamp is lighted up, electrons and ions produced in the mantle tube bombard the inside surface of the cup-shaped electrode to make the cup-shaped electrode eject atoms of the material of the cup-shaped electrode. The ejected atoms scatter on a part near the open end of each of the cup-shaped electrodes of the inside surface of the mantle tube to trigger the deposition of a sputtered film.

When the cold-cathode fluorescent lamp is used for a long lighting time, electrons and ions produced in the mantle tube corrode the cup-shaped electrode by electrolytic corrosion. Substances produced by electrolytic corrosion adhere to the inside surface of the cup-shaped electrode or a part near the open end of each of the cup-shaped electrodes of the inside surface of the mantle tube to form a sputtered film progressively. While on the one hand the sputtered film is advantageous to the improvement of the discharge starting characteristic of the cold-cathode fluorescent lamp, the sputtered film is likely to connect to the cup-shaped electrode because the size of the gap between the cup-shaped electrode and the mantle tube is as small as 0.2 mm or below. The sputtered film serves also as the electrode when the sputtered film connects to the cup-shaped electrode and receives electrons. Consequently, the sputtered film is heated excessively, the mantle tube is melted by the heat of the excessively heated sputtered film and eventually the mantle tube cracks.

The sputtered film of the metal oxide deposited on the inside surface of the cup-shaped electrode of the cold-cathode fluorescent lamp of this construction is formed by black metal particles. Therefore, the black sputtered film is formed on a part near each of the cup-shaped electrodes of the fluorescent film formed on the inside surface of the mantle tube to obstruct the fluorescent light emission of the part near the cup-shaped electrode of the fluorescent film. Thus, there has been a problem that ineffective lighting regions not contributing to lighting in opposite end parts of the cold-cathode fluorescent lamp are enlarged, an effective region in the fluorescent film is narrowed and, consequently, the effective lighting area of the lighting device is narrowed.

Accordingly, it is an object of the present invention to shorten a discharge start time needed by a cold-cathode fluorescent lamp using electrons emitted by a cold cathode which is a representative cold-cathode lamp, and to provide a cold-cathode fluorescent lamp capable of lighting up upon the connection of the cold-cathode fluorescent lamp to a power source (discharge start time of 1 ms or below in darkness) and of maintaining a stable electric discharge for a long time, and to provide a liquid crystal display provided with the cold-cathode fluorescent lamp as a light source.

In a cold-cathode fluorescent lamp according to the present invention, a discharge inducing film is formed in a part near a cup-shaped electrode of the inside surface of a mantle tube to induce the emission of electrons by the cup-shaped electrode when a voltage is applied to the cup-shaped electrode so that the cold-cathode lamp may instantly light up.

A liquid crystal display according to the present invention includes: a liquid crystal display panel formed by sandwiching a liquid crystal layer between a pair of transparent substrates provided on their inner surfaces with pixel electrodes; and a backlight unit including at least one cold-cathode fluorescent lamp capable of emitting illuminating light and disposed opposite to the back surface of the liquid crystal display panel; wherein a discharge inducing film is formed in a part near a cup-shaped electrode of the inside surface of a mantle tube included in the cold-cathode fluorescent lamp to light up the cold-cathode fluorescent lamp upon the connection of the cold-cathode fluorescent lamp to a power source.

Since the discharge inducing film is deposited in the part near the cup-shaped electrode of the inside surface of the mantle tube, the ejection of electrons is promoted and hence discharge start time can be shortened. Since the conventional sputtered film is not used for inducing an electric discharge, the electrode does not need to have any metal oxide and any sputtered film does not need to be deposited on a part near each of the cup-shaped electrodes of the inside surface of the mantle tube. Thus the cold-cathode fluorescent lamp of the present invention has a long life.

The liquid crystal display including the illuminating device provided with the cold-cathode fluorescent lamp of the present invention as a light source can display high-quality images for a long time.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
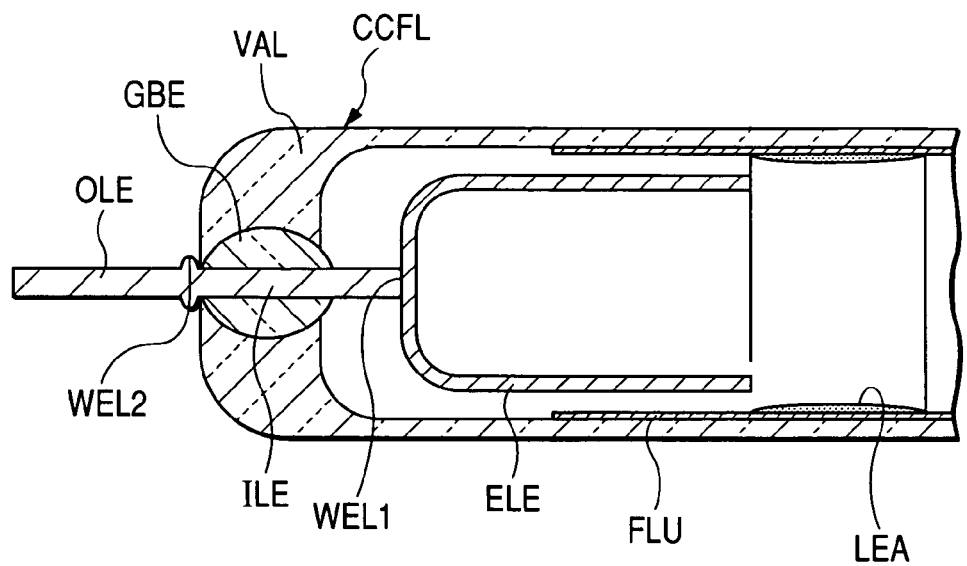
FIG. 1 is an enlarged sectional view of an important part of a cold-cathode fluorescent lamp in a first embodiment according to the present invention.

FIG. 1 is an enlarged sectional view of a part on a high-tension side of a cold-cathode fluorescent lamp CCFL in a first embodiment according to the present invention.

Referring to FIG. 1, the cold-cathode fluorescent lamp CCFL includes a glass tube VAL, namely, a mantle tube of a transparent insulating material, and a pair of cup-shaped electrodes ELE disposed in opposite end parts, respectively, of the glass tube VAL. Neon-argon gas (Ne—Ar gas), namely, an inert gas, and mercury are sealed in the glass tube VAL after evacuating the glass tube VAL. The inside surface of the glass tube VAL is coated with a fluorescent film FLU. The cup-shaped electrodes ELE are formed by pressing, for example, a nickel sheet in the shape of a cup. The cup-shaped electrodes ELE are disposed with their open ends faced each other and directed toward a main discharge region. Inner leads ILE made of a metal having a coefficient of thermal expansion nearly equal to that of glass, such as a Ni—Co—Fe alloy, are attached to the outer ends of the cup-shaped electrodes ELE, respectively, by welded joints WELL formed by, for example, a butt resistance welding method or a butt laser welding method. The glass tube VAL of the cold-cathode fluorescent lamp CCFL has a wall thickness between about 100 and about 250 µm, an outside diameter between about 1.0 and about 10.0 mm and a length between about 50 and about 800 mm.

Each of the inner leads ILE is supported hermetically in a glass bead GBE. The glass beads GBE are welded to the opposite end walls of the glass tube VAL, the opposite ends of the glass tube VAL are closed by seal off. Outer leads OLE of, for example, nickel are joined to the outer ends of the inner leads ILE by welded joints WEL2 formed by, for example, a butt laser welding method. The outer leads OLE are connected to a power circuit, not shown, such as a lighting inverter, to supply power across the cup-shaped electrodes ELE.

A part near the open end of each of the cup-shaped electrodes ELE of the fluorescent film FLU formed on the inside surface of the glass tube VAL is coated with discharge inducing film, such as an ITO film (transparent conductive film) LEA. The discharge inducing ITO film LEA induces an electric discharge between the cup-shaped electrodes ELE. The discharge inducing ITO film LEA is formed by forming an ITO slurry film by dipping the glass tube VAL in an ITO slurry, and baking the ITO film. The discharge inducing ITO film LEA has a length of about 3 mm and a thickness of about 2 µm. The discharge inducing ITO film LEA is thinner than the fluorescent films FLU.

The discharge inducing ITO films LEA receive cosmic rays from space penetrated the transparent glass tube VAL and the fluorescent film FLU to activate free electrons moving in the glass tube VAL of the cold-cathode fluorescent lamp CCFL. When a voltage is applied across the pair of cup-shaped electrodes ELE, the ejection of electrons from the discharge inducing ITO film LEA is induced and the cup-shaped electrodes ELE eject electrons. Consequently, an electric discharge is started quickly.

Thus the discharge inducing ITO film LEA of 2 µm or below in thickness is formed on the part near the open end of the cup-shaped electrode ELE of the inside surface of the glass tube VAL. The discharge inducing ITO film LEA suppresses the seizure of mercury sealed in the glass tube VAL and contributing to light emission and promotes the emission of electrons. Consequently, the discharge start time is shortened, any sputtered metal oxide film, which is needed by the related art, does not need to be deposited on the inside surfaces of the cup-shaped electrodes and hence the rate of deposition of a metal oxide on the inside surface of the glass tube VAL is reduced accordingly. Thus the cold-cathode fluorescent lamp CCFL of the present invention has a long life and can maintain a stable electric discharge.

The cold-cathode fluorescent lamp CCFL is provided with the discharge inducing ITO film LEA on the part near the open end of the cup-shaped electrode ELE, of the inside surface of the glass tube VAL. The discharge inducing ITO film LEA serves as part of a sputtering source. Therefore a sputtered film of a metal oxide, which needs to be formed on the inside surface of a glass tube for a known cold-cathode fluorescent lamp, is not necessary. Thus ineffective light emitting regions appear scarcely on the fluorescent film FLU and hence an effective light emitting region can be extended by a length between about 1 and about 2 mm in the opposite ends of the glass tube VAL.

Since the fluorescent film FLU has a large effective light emitting region, the effective light emitting region can be enlarged at a low cost without reducing the respective axial lengths of the cup-shaped electrodes ELE and the inner leads ILE. The deposition of a sputtered film on the inside surface of the glass tube VAL can be retarded, the melting of the glass tube VAL can be prevented and time before the glass tube VAL cracks can be extended.

Although the discharge inducing ITO film LEA is supported to be formed in one of the opposite longitudinal end parts in the foregoing description, it is important to form the discharge inducing ITO film LEA at least in the end part on the high-tension side. Discharge inducing films LEA of ITO may be formed in both a part on the high-tension side and a part on the low-tension side.

The discharge inducing film LEA may be an IZO film instead of the ITO film.

Figure 2:
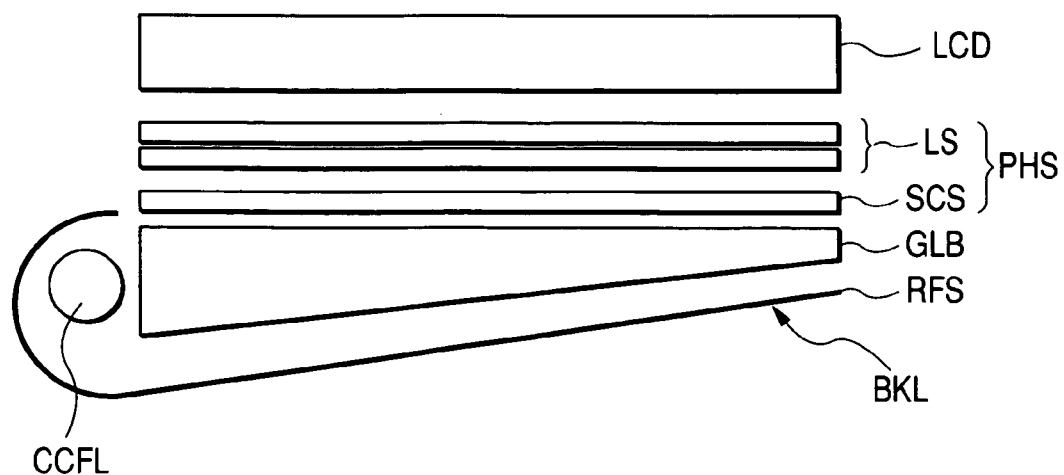
FIG. 2 is a sectional view of an important part of a liquid crystal display according to the present invention for a notebook size personal computer.

Referring to FIG. 2 showing a liquid crystal display in a second embodiment according to the present invention for a notebook size personal computer PC in a typical sectional view, the liquid crystal display includes a liquid crystal display unit including a liquid crystal display panel LCD, and a laminated optical compensation unit PHS including a lens sheet LS and a diffusing sheet SCS and disposed behind the liquid crystal display panel LCD, and a backlight unit BKL including a light guide plate GLB disposed opposite to the diffusing sheet SCS, a reflecting sheet RFS disposed behind the light guide plate GLB, and a cold-cathode fluorescent lamp CCFL like the cold-cathode fluorescent lamp CCFL in the first embodiment extended along one of the opposite side edges of the light guide plate GLB.

Figure 3:
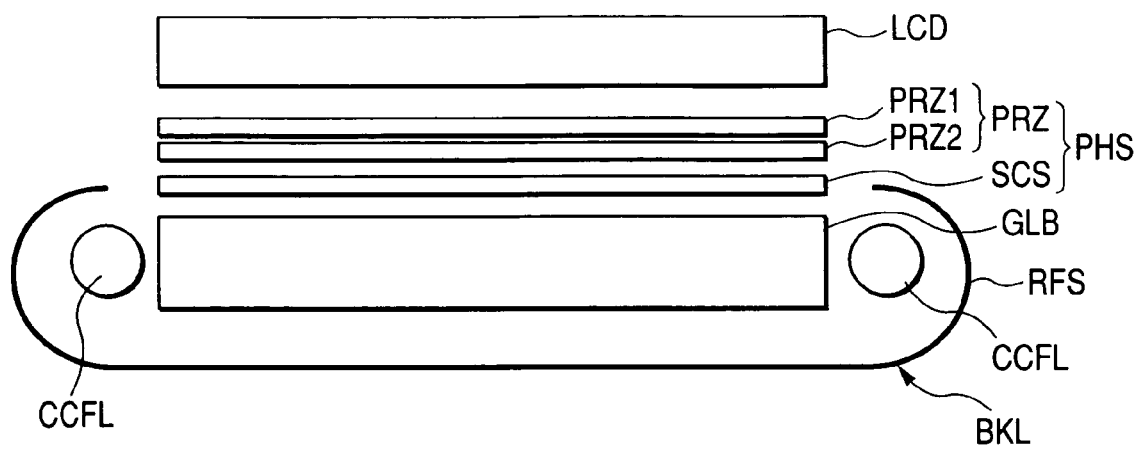
FIG. 3 is a sectional view of an important part of a liquid crystal display according to the present invention as a monitor for a personal computer.

Referring to FIG. 3 showing a liquid crystal display in a third embodiment according to the present invention in a typical sectional view, the liquid crystal display includes a liquid crystal display unit including a liquid crystal display panel LCD and a laminated optical compensation unit PHS including a prism sheet PRZ and a diffusing sheet SCS and disposed behind the liquid crystal display panel LCD, and a backlight unit BKL including a light guide plate GLB disposed opposite to the back surface of the laminated optical compensation unit PHS, a reflecting sheet RFS disposed behind the light guide plate GLB, and cold-cathode fluorescent lamps CCFL like the cold-cathode fluorescent lamp CCFL in the first embodiment extended along the opposite side edges, respectively, of the light guide plate GLB. The liquid crystal display is applied to monitors for personal computers, such as liquid crystal car navigation systems, monitors for digital devices, liquid crystal monitors for medical instruments, liquid crystal monitors for printing and designing systems.

Figure 4:
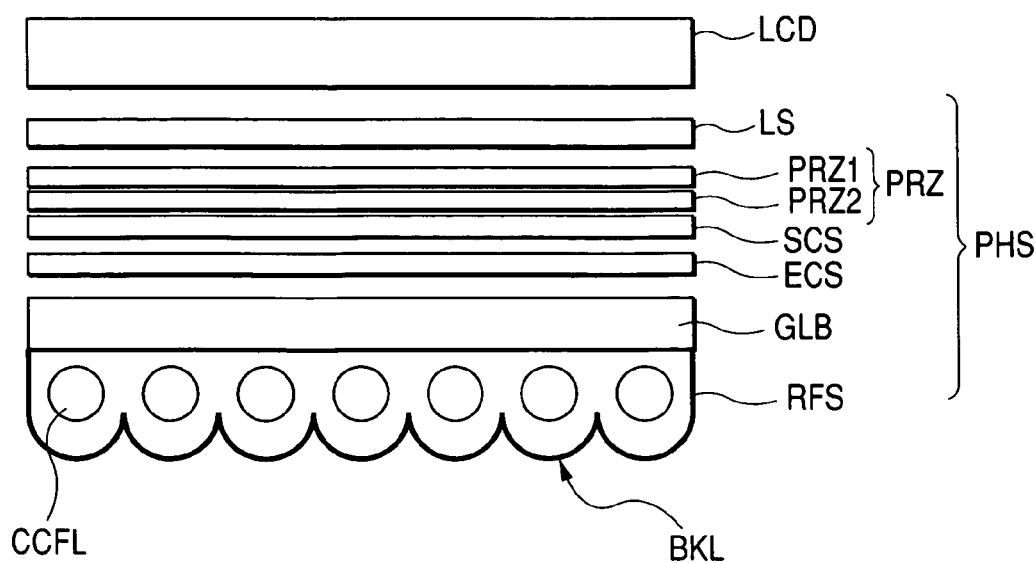
FIG. 4 is a sectional view of an important part of a liquid crystal display according to the present invention for a liquid crystal television receiver.

Referring to FIG. 4 showing a liquid crystal display in a third embodiment according to the present invention in a typical sectional view, the liquid crystal display includes a liquid crystal display unit including a liquid crystal display panel LCD and a laminated optical compensation unit PHS including lens sheet LS, a prism sheet PRZ, a diffusing sheet SCS, an electromagnetic shielding sheet ECS and a diffusing plate DFP and disposed behind the liquid crystal display panel LCD, and a backlight unit BKL including a light guide plate GLB disposed opposite to the back surface of the laminated optical compensation unit PHS, a reflecting sheet RFS disposed behind the light guide plate GLB, and a plurality of cold-cathode fluorescent lamps CCFL like the cold-cathode fluorescent lamp CCFL in the first embodiment extended in a parallel arrangement in a space between the light guide plate GLB and the reflecting sheet RFS.

The liquid crystal display employs the cold-cathode fluorescent lamps CCFL like the cold-cathode fluorescent lamp CCFL as the light source for the backlight unit, namely, the illuminating device, and the cold-cathode fluorescent lamps CCFL are capable of maintaining a satisfactorily stable electric discharge and have a long life. Therefore, the liquid crystal display can surely displaying high-quality images for a long time.

Figure 5:
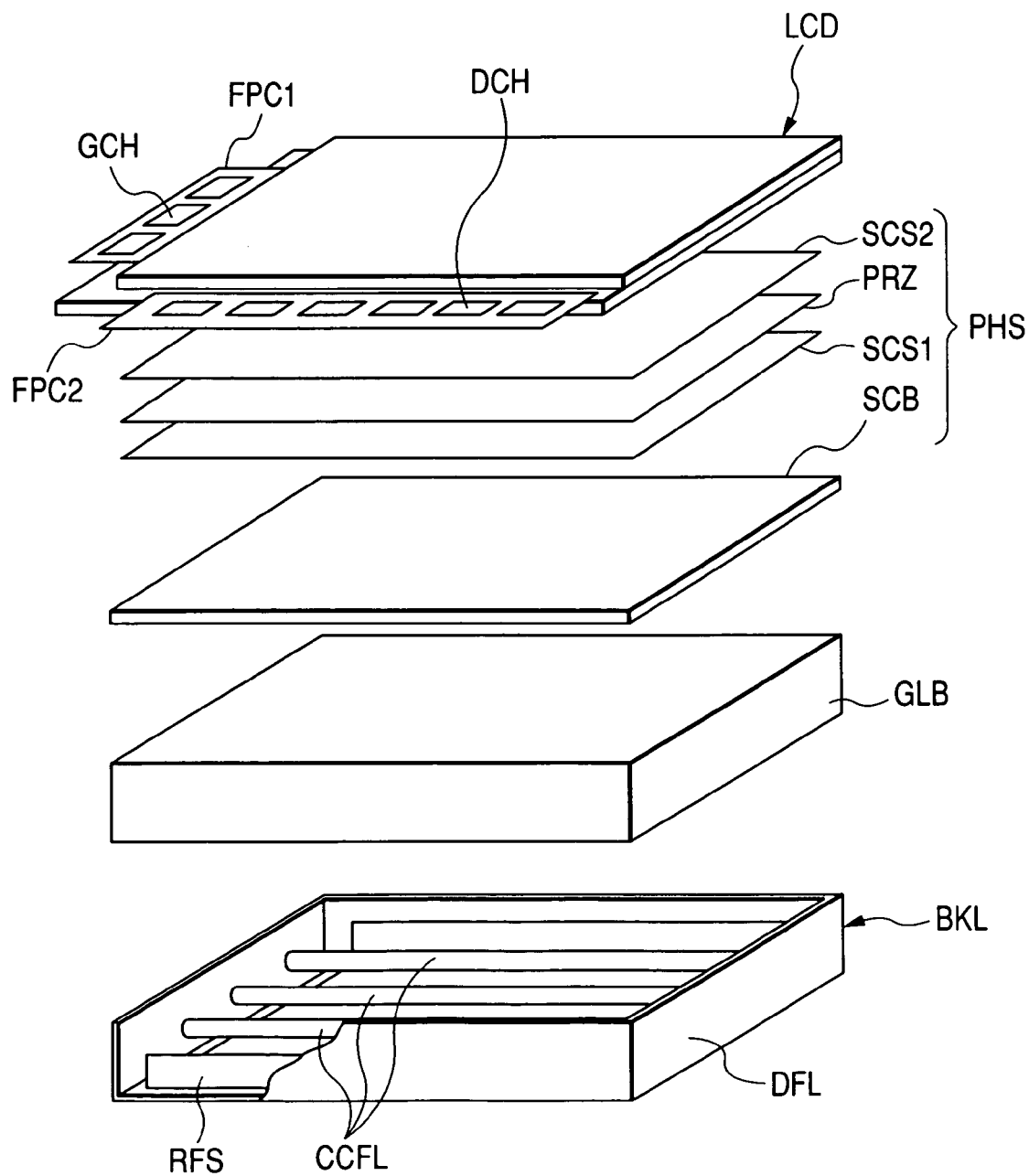
FIG. 5 is an exploded typical perspective view of a liquid crystal display provided with a direct backlight unit.
Figure 6:
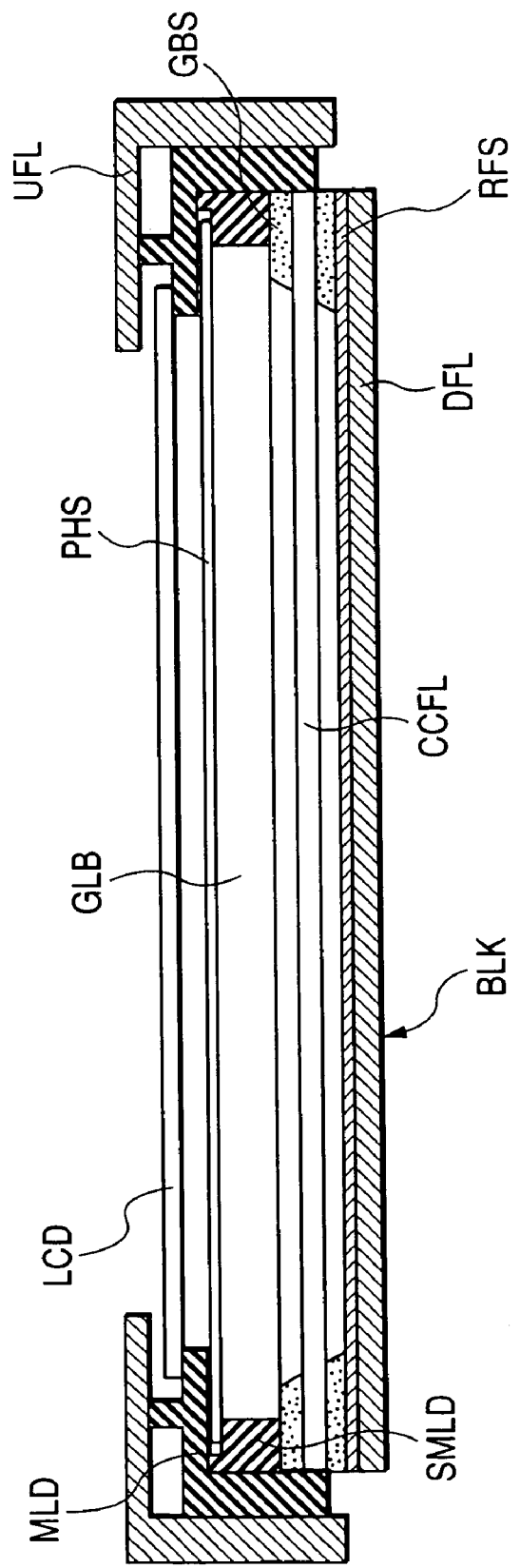
FIG. 6 is a typical sectional view of the liquid crystal display shown in FIG. 5 built by assembling the component parts shown in FIG. 5.

FIG. 5 is an exploded typical perspective view of a liquid crystal display provided with a direct backlight unit. Although the liquid crystal display shown in FIG. 5 is provided with an upper frame UFL disposed above a liquid crystal display panel LCD, the upper frame UFL is omitted in FIG. 5. FIG. 6 is a typical sectional view of the liquid crystal display shown in FIG. 5 built by assembling the component parts shown in FIG. 5.

Referring to FIGS. 5 and 6, a liquid crystal display panel LCD is formed by sandwiching a liquid crystal layer between a pair of transparent substrates provided on their inner surfaces with pixel electrodes. One of the substrates generally called an active matrix substrates has projecting peripheral parts extending outward beyond edges of the other substrate generally called a color filter substrate. A flexible printed wiring strip FPC1 having a chip GCH provided with a scanning signal line driving circuit, and a flexible printed wiring strip FPC2 having a chip DCH provided with a data signal line driving circuit are mounted on the projecting peripheral parts, respectively, of the former substrate.

In this liquid crystal display, a backlight unit BKL is formed by laying a reflecting sheet RFS in a lower frame DFL, extending a plurality of cold-cathode fluorescent lamp CCFL in a parallel arrangement above the reflecting sheet RFS and disposing a light guide plate GLB of a transparent resin above the cold-cathode fluorescent lamps CCFL. The lower frame DFL is formed by processing a metal sheet. The upper frame UFL is formed by processing a metal sheet. The lower frame DFL, a laminated optical compensation unit PHS, a liquid crystal display panel LCD and the upper frame UFL are superposed in that order. The length of the cold-cathode fluorescent lamps CCFL corresponds substantially to the length of the liquid crystal panel LCD. The glass tubes of the cold-cathode fluorescent lamps CCFL have a small diameter. Usually, opposite end parts of the cold-cathode fluorescent lamps CCFL are supported in rubber bushings GBS.

The laminated optical compensation unit PHS is formed by laminating different kinds of optical compensation sheets. The laminated optical compensation unit PHS is held between the light guide plate GLB and the liquid crystal display panel LCD. The laminated optical compensation unit PHS includes a diffusing plate SCB, a first diffusing sheet SCS1, two superposed prism sheets PRZ superposed with their prisms intersecting each other, and a second diffusing sheet SCS2. The direct backlight unit BKL has a side holding frame SMLD of a resin called a side mold mounted on side parts of the bottomed lower frame DFL. Peripheral parts of the light guide plate GLB and the laminated optical compensation unit are held by the side holding frame SMLD.

As shown in FIG. 6, the backlight unit BKL holding the light guide plate GLB and the laminated optical compensation unit PHS is combined with the liquid crystal display panel LCD by a mold frame MLD and the upper frame UFL is put on the mold frame MLD. Then, the liquid crystal display is completed by fastening together the upper frame UFL and the lower frame DFL by fastening members. When the liquid crystal display panel LCD is large, a light diffusing plate or a light diffusing sheet is used instead of the light guide plate GLB.

Although the invention has been described in its preferred embodiments with a certain degree of particularity, obviously many changes and variations are possible therein. Therefore it is to be understood that the present invention may be practiced otherwise than as specifically described herein without departing from the scope and spirit thereof.

What is claimed is:

1. A cold-cathode fluorescent lamp comprising:
    a mantle tube of a transparent insulating material having an inside surface coated with a fluorescent film;
    cup-shaped electrodes disposed in opposite end parts of the mantle tube with their open ends opening into a discharge region in the mantle tube and facing each other, and respectively having outer end walls; and
    inner power supply leads connected to the outer end walls of the cup-shaped electrodes, respectively;
    wherein a non-sputtered transparent conductive film of a predetermined thickness is formed in a part near each open end of the cup-shaped electrodes of the inside surface of the mantle tube, and
    a transparent conductive film is formed in a part near each of the cup-shaped electrodes of the inside surface of the mantle tube, and
    wherein the material of the transparent conductive film is different from the material of the cup shaped electrodes.

2. The cold-cathode fluorescent lamp according to claim 1, wherein the transparent conductive film is an ITO film.

3. The cold-cathode fluorescent lamp according to claim 1, wherein transparent conductive film is an IZO film.

4. A liquid crystal display comprising:
    a liquid crystal display panel; and
    an illuminating unit disposed opposite to a back surface or a front surface of the liquid crystal display panel;
    wherein the illuminating unit includes a cold-cathode fluorescent lamp equivalent to the cold-cathode fluorescent lamp stated in claim 1 as a light source.

5. A liquid crystal display comprising:
    a liquid crystal display panel formed by sandwiching a liquid crystal layer between a pair of transparent substrates provided on their inner surfaces with pixel electrodes;
    a backlight unit including a light source capable of emitting illuminating light on a back surface of the liquid crystal display panel;
    a laminated optical compensation sheet disposed between the liquid crystal display panel and the backlight unit; and
    a frame enclosing the liquid crystal display panel, the laminated optical compensation sheet and the backlight unit;
    wherein light source of the backlight unit includes at least one cold-cathode fluorescent lamp equivalent to the cold-cathode fluorescent lamp stated in claim 1.

* * * * *